UNITED STATES PATENT OFFICE.

ALBRECHT SCHMIDT AND ERNST BRYK, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

VAT DYE AND PROCESS OF MAKING SAME.

No. 916,030.    Specification of Letters Patent.    Patented March 23, 1909.

Application filed May 22, 1907. Serial No. 375,125.

*To all whom it may concern:*

Be it known that we, ALBRECHT SCHMIDT, Ph. D., and ERNST BRYK, Ph. D., chemists, citizens of the Empires of Germany and Austria-Hungary, respectively, residing at Höchst-on-the-Main, Germany, have invented certain new and useful Improvements in Making Vat Dyestuffs, of which the following is a specification.

We have found a process of making vat dyestuffs by treating with chlorsulfonic acid ($SO_3HCl$) such halogen substitution products of arylthioglycolic acids as are not substituted in one ortho position to the $S.CH_2COOH$ group, that is to say, thioglycolic acids of the general constitution:

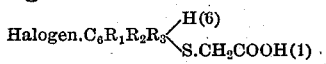

wherein $R_1$, $R_2$, $R_3$ means radicals, for instance, hydrogen, methyl, halogen, alkoxyl ($CH_3O-$, $C_2H_5O-$) $NO_2$.

Vat dyestuffs of the composition:

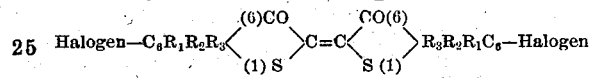

are thus obtained.

The process is carried out by introducing the thioglycolic acid in question into the chlorsulfonic acid; according to the thioglycolic acid cooling or gently heating may occur, whereby hydrochloric acid is evolved. On the reaction being complete the whole is poured on ice and filtered.

The dyestuffs are washed with hot water, hot dilute alkalies and then with hot alcohol so as to remove any unchanged parent material and by-products. They are insoluble in water, alkalies and dilute acids and when treated with alkaline reducing agents, like hydrosulfite, they are dissolved in form of leuco-compounds, dyeing from such solutions (vats) cotton and wool very fast shades which vary according to the kind, number and position of the substituents, as may be seen from the accompanying table.

The above mentioned parent materials, the halogen-thioglycolic acids, may be obtained according to known methods, for instance, from the corresponding halogen anilin by diazotizing an amin halogen substituted and not substituted in one ortho position, by combining the diazo compound with a xanthogenate and by treating the xanthogenate with chloracetic acid in alkaline solution, for instance, in alcohol-alkaline solution.

Example I. 1 part by weight of chlorphenylthioglycolic acid

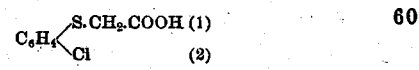

obtained from o-chloranilin, is introduced while cooling into 1–2 volume parts of chlorsulfonic acid, whereby the temperature rises to about 35° C. It may be even stirred for a considerable time with stronger cooling. On the reaction being complete the mass is further worked up as described above. The dyestuff thus obtained having the formula:

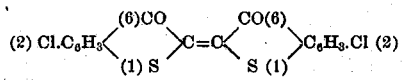

is a bluish-red powder dyeing in the vat cotton and wool very fast red tints.

The condensation may also occur in presence of such agents as accelerate it, for instance, boric acid and the like.

Example II. 1 part by weight of chlortolylthioglycolic acid

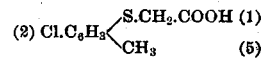

obtained, for instance, from ortho-chlor-meta-toluidin $NH_2$: Cl: $CH_3 = 1: 2: 5$, is introduced at ordinary temperature into 1½ volume parts of chlorsulfonic acid, whereby the temperature rises to about 40° C.; it is stirred until a decided green coloration occurs and the mass is worked up as described heretofore. The dyestuff thus obtained having the formula:

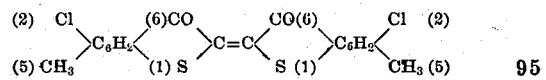

is a bluish-red powder, dyeing cotton and wool in the vat bluish-red tints.

Example III. 1 part by weight of chloranisylthioglycolic acid

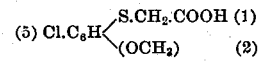

obtained, for instance, from chloranisidin

is introduced into the above described chlorsulfonic acid. The mass then becomes red and on the reaction being complete it is worked up in the manner described above. The dye stuff having the formula:

$$\text{Cl}(5)\underset{(2)(OCH_3)}{\overset{}{\diagdown}}\text{C}_6\text{H}_2\underset{(1)\text{S}}{\overset{(6)\text{CO}}{\diagdown}}\text{C}=\text{C}\underset{\text{S}(1)}{\overset{\text{CO}(6)}{\diagdown}}\text{C}_6\text{H}_2\underset{(2)(OCH_3)}{\overset{}{\diagdown}}\text{Cl}(5)$$

is a dark violet powder, dyeing cotton and wool in the vat very beautiful violet-blue tints.

The condensation may also occur in presence of such agents as accelerate it, for instance, boric acid and the like.

In this manner we have obtained vat dyestuffs by means of chlorsulfonic acid from chlorarylthioglycolic acids, as shown in the following table:

| | | |
|---|---|---|
| Chlorphenylthioglycolic acid S.CH$_2$COOH : Cl | 1 : 4 | Violet-red on cotton |
| "    "    "    "    "    " | 1 : 3 | Red    "    " |
| "    "    "    "    "    " | 1 : 2 | "    "    " |
| Dichlorphenylthioglycolic acid S.CH$_2$COOH : Cl | 1 : 2 : 4 | Red-violet on cotton |
| "    "    "    "    "    " | 1 : 3 : 4 | "    "    " |
| "    "    "    "    "    " | 1 : 2 : 5 | Bluish-red "    " |
| "    "    "    "    "    " | 1 : 3 : 5 | Red on wool |
| Chlortolylthioglycolic acid SCH$_2$COOH : CH$_3$ : Cl | 1 : 2 : 4 | Red-violet on cotton |
| "    "    "    "    "    " | 1 : 3 : 4 | "    "    "    " |
| "    "    "    "    "    " | 1 : 4 : 6 | "    "    "    " |
| "    "    "    "    "    " | 1 : 4 : 5 | "    "    "    " |
| "    "    "    "   SCH$_2$COOH : Cl : CH$_3$ | 1 : 2 : 5 | Red    "    " |
| Bromphenylthioglycolic acid SCH$_2$COOH : Br | 1 : 4 | Red-violet on cotton |
| "    "    "    "    "    " | 1 : 3 | "    "    "    " |
| Chlor-p-xylylthioglycolic acid S.CH$_2$COOH : CH$_3$ : Cl : CH$_3$ | 1 : 2 : 4 : 5 | Red-violet on cotton |
| Dichlor-m-tolylthioglycolic acid S.CH$_2$COOH : Cl : Cl : CH$_3$ | 1 : 2 : 4 : 5 | Red-violet on cotton |
| Chloranisylthioglycolic acid S.CH$_2$COOH : Cl : O : CH$_3$ | 1 : 5 : 2 | Violet-blue on cotton |
| Chlorphenetidylthioglycolic acid S.CH$_2$COOH : Cl : OC$_2$H$_5$ | 1 : 5 : 2 | Violet-blue on cotton |

Having now described our invention, what we claim is:

1. The process herein described of making vat dyestuffs for cotton and wool, which consists in treating with chlorsulfonic acid halogenarylthioglycolic acids of the type:

$$\text{Halogen}-\text{C}_6\text{R}_1\text{R}_2\text{R}_3\underset{\text{S.CH}_2.\text{COOH}}{\overset{\text{H (6)}}{\diagdown}}$$

wherein R$_1$R$_2$R$_3$ mean hydrogen, halogen, methyl, alkoxyl.

2. As new products, the vat dyestuff dyeing cotton in the vat red, bluish-red, violet, having the general formula:

$$\text{Halogen}-\text{C}_6\text{R}_1\text{R}_2\text{R}_3\underset{(1)\text{S}}{\overset{(6)\text{CO}}{\diagdown}}\text{C}=\text{C}\underset{\text{S}(1)}{\overset{\text{CO}(6)}{\diagdown}}\text{C}_6\text{R}_1\text{R}_2\text{R}_3-\text{Halogen}$$

wherein R$_1$ and R$_2$ mean hydrogen, halogen, methyl, alkoxyl, and R$_3$ halogen, methyl, alkoxyl, being insoluble in water, alkalies and dilute acids, ligroin, alcohol and ether; soluble in hot nitrobenzene with a violet-red color, in cold concentrated sulfuric acid with a greenish color, from which solution it is reprecipitated unchanged by water, forming when treated with alkaline reducing agents, like hydrosulfite, a yellow vat solution and producing on porcelain a metallic stroke.

In testimony, that we claim the foregoing as our invention, we have signed our names in presence of two subscribing witnesses.

ALBRECHT SCHMIDT.
ERNST BRYK.

Witnesses:
JEAN GRUND,
CARL GRUND.